United States Patent Office 3,460,668
Patented Aug. 12, 1969

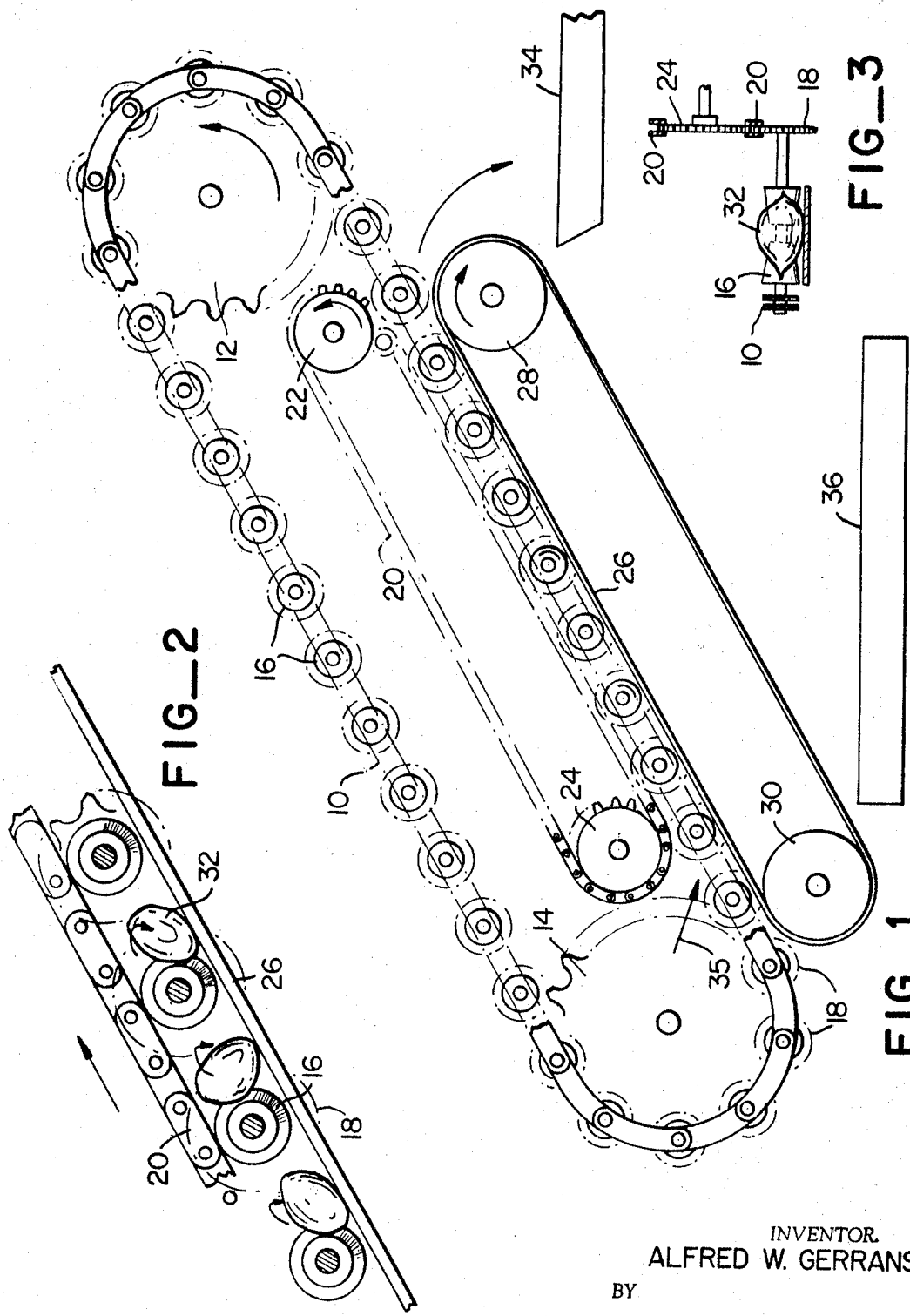

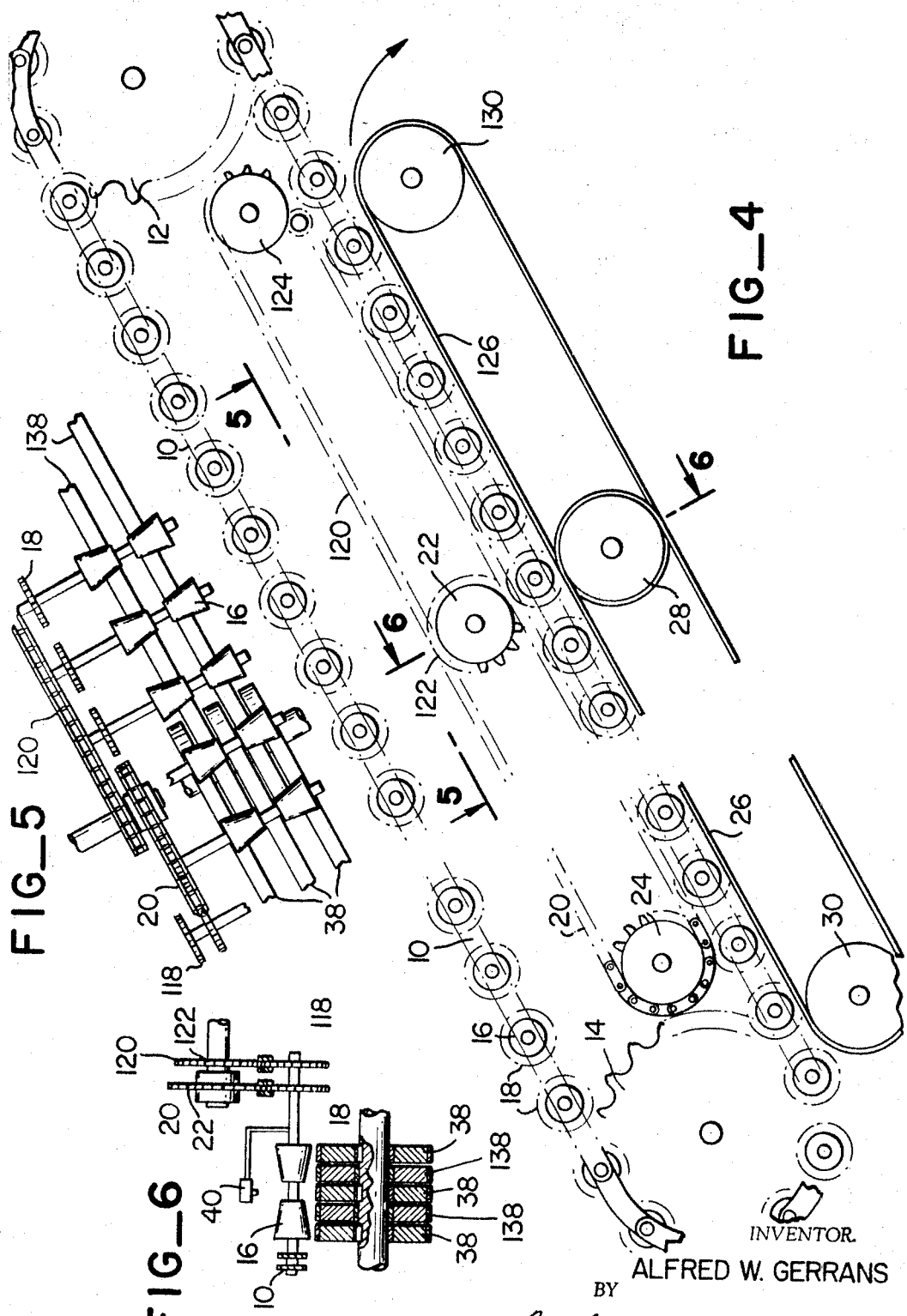

3,460,668
ARTICLE ORIENTING AND SPACING DEVICE
Alfred W. Gerrans, San Jose, Calif., assignor to Sunsweet Growers, Inc., San Jose, Calif., a corporation of California
Filed Jan. 3, 1967, Ser. No. 606,854
Int. Cl. B65g 47/31, 19/02, 37/00
U.S. Cl. 198—33                           12 Claims

ABSTRACT OF THE DISCLOSURE

The operating speed of an inclined platform type prune aligning and spacing device in a packing machine is greatly increased by making the platform along which the prunes are rolled movable in its own right. The operating speed is then determined by the total speed of the system, whereas the prune rotation is determined by the relative speed of the system components to one another. Successive segments having different rotational speeds can thus be provided as e.g., for inspection purposes.

---

This invention relates to article aligning and spacing devices, and particularly to an inclined platform conveyor as typically used in the prune packing industry.

The use of inclined conveyors for aligning and spacing prunes during the packing process is well known from United States Patent No. 3,234,984 to Cantoni et al. (see particularly FIGS. 1, 3 and 7 of that patent), assigned to the assignee of this application. In that patent, the prunes are rolled upwardly along a stationary surface by concave rollers. A device of this nature is limited in its speed due to the shape and consistency of prunes. For example, the maximum speed at which the device of the aforesaid patent can be operated is in the vicinity of 200 prune r.p.m.

It has now been discovered that the speed, and hence the efficiency of the sorting and and aligning system, can be considerably increased without exceeding the critical parameters by making the inclined surface along which the prunes are rolled movable in its own right, in the same direction as the linear motion of the concave rollers. By doing this, the number of prunes passing by any fixed point in space (i.e., the discharge point) per second can be greatly increased; yet at the same time, the number of r.p.m. of the prunes along the inclined surface can remain unchanged.

In addition, the provision of a movable inclined surface permits the provision of a plurality of successive sections on the same concave roller chain in which the prunes are rotated at different speeds. Such an arrangement is useful, for example, where it is desired to roll the prunes first at a high speed to align and space them, and then at a low speed to subject them to photoelectric inspection.

It is therefore the object of the present invention to provide an article separating and aligning device in which articles can be rolled by concave rollers against a movable surface to make their speed of revolution independent of the linear traveling speed of the device.

It is another object of the invention to provide a device of the type described in which the travel of the article along the inclined surface can be subdivided into segments of varying speeds of revolution along a single concave roller chain.

These and other objects of the invention will become apparent from a perusal of the following specification, taken in connection with the accompanying drawings, in which:

FIG. 1 is a schematic side elevation of a single section device constructed in accordance with this invention;
FIG. 2 is an enlarged detail view of a portion of FIG. 1;
FIG. 3 is a section along line 3—3 of FIG. 2;
FIG. 4 is a view similar to FIG. 1 but showing a two-section device;
FIG. 5 is a plan view along line 5—5 of FIG. 4; and
FIG. 6 is a section along line 6—6 of FIG. 4.

In FIG. 1, an endless roller chain 10 is moved in a counterclockwise direction over sprocket wheels 12, 14. The roller chain 10 carries individually journaled rollers 16 which are provided with roller sprockets 18. The roller sprockets 18 are adapted to engage a pacing chain 20 which is driven around sprockets 22, 24. Underneath the rollers 16, an inclined surface is provided in the form of a belt 26 which is conveyed over drums 28, 30.

It will be understood that wherever chains and sprockets are mentioned herein, other types of drive such as friction drive, are also satisfactory, as the precise relative motion of the elements with respect to one another is not critical.

In general, however, the pacing chain 20 is arranged to move at the same linear speed as the belt 26, whereas the linear speed of the roller chain 10 is geater than the foregoing. As a result, as soon as the roller sprockets 18 engage the pacing chain 20, the rollers 16 will begin to rotate counterclockwise at a speed which is determined by the speed differential between the roller chain 10 and the pacing chain 20.

As is best shown in FIGS. 2 and 3, the concave rollers 16 are of approximately the same median diameter as the prunes 32 which are to be conveyed. Consequently, as the rollers 16 turn in a counterclockwise direction in FIG. 2, the prunes will be rolled upwardly along the belt 26 in a clockwise direction at a speed of rotation approximately equal to the speed of rotation of rollers 16. Consequently, by adjusting the relative speed of the roller chain 10 with respect to the pacing chain 20, it is possible to rotate the prunes 32 at any desired speed within the critical limits.

However, it will be seen that since the belt 26, pacing chain 20, and roller chain 10 move as a coherent system, it is possible to increase the velocity of all three components by an equal amount without changing the velocity of rotation of the prunes 32. At the same time, the increased velocity of the system results in more prunes per second reaching the end of belt 26 and being discharged into the receiving hopper 34 (excess prunes fed into the system by the input hopper schematically depicted as arrow 35 are discharged during the aligning process over the sides of the conveyor and fall into a return hopper 36).

FIG. 4 shows an adaptation of the basic FIGS. 1 through 3 to the more complex situation in which it is desired to rotate the prunes fast at first for purposes of sorting and aligning, and then slowly for the purposes of scanning them with, say, a photoelectric quality control device.

In FIG. 4 the roller chain once again is shown at 10 with its rollers 16 and sprockets 18. The roller chain 10, as in the embodiment of FIGS. 1 through 3, is carried around sprocket wheels 12 and 14. This time, however, two separate pacing chains 20 and 120 are provided. The pacing chain 20 is driven by sprocket wheel 24 and is threaded around idler wheel 22. The pacing chain 120, on the other hand, is driven by sprocket wheel 124 and is threaded over a separate idler wheel 122 which is on the same shaft with idler wheel 22 but can turn at a different velocity therefrom.

Likewise, belt 26 is subdivided into a plurality of strips 38 which are threaded over pulleys 28, the latter being preferably mounted for idling movement on their shaft. The strips 38 making up the belt 26 are preferably driven by drive pulleys 30.

In the upper section belt 126 is made up of strips 138 which are disposed between the strips 38 as all are threaded around pulleys 28 (see FIG. 6). The strips 138 making up the belt 126 are preferably driven by drive pulleys 130.

If it is now desired, for example, to rotate the prunes 32 fast in the lower section of the device of FIG. 4, and slowly in the upper section, the linear velocity of pacer chain 20 and belt 26 is kept relatively slow. As a result, the roller chain 10 moves much faster than the pacer chain 20 and the belt 26, and in the lower section of the device the rollers 16 will turn very fast. On the other hand, in the upper section of the device of FIG. 4, the pacer chain 120 and the belt 126 are made to move at a linear speed only very slightly less than the linear speed of the roller chain 10. Since the speed differential between the roller chain 10 and the pacer chain 120 is very small, it will be readily seen that the rollers 16 turn very slowly in the upper section of the device of FIG. 4. Consequently, by disposing a photoelectric device 40 above and in front of each concave roller 16, as schematically depicted in FIG. 6, it is possible to examine each prune as it rotates very slowly underneath the photoelectric device 40 during its travel through the upper section of the device of FIG. 4. It will be understood that the photoelectric device 40 can be connected to operate an ejection mechanism or other device in a manner well known in the art.

Again, it will be seen that the number of prunes discharged pe rminute from the upper end of belt 126 is a function only if the linear velocity of roller chain 10, and is in no way affected by the velocity of rotation chosen in determining the speeds of belt 26 and pacer chain 20 on the one hand, and belt 126 and pacer chain 120 on the other.

It will be seen that the present invention provides a mechanism which is not only capable of greatly accelerating the sorting and aligning process without interfering with its effectiveness, but which, in addition, makes possible various successive operations at different prune rotation speeds in a single pass through the device. It will, of course, be understood that the faster the device is made to operate, the longer the belts 26 and 126 have to be, as the effectiveness of the device is determined by the total number of prune rotations per pass. Obviously, the teachings of this invention can be carried out in various way of which the embodiment described herein is merely illustrative. Therefore, I do not desire to be limited by the embodiment shown and described.

I claim:

1. An article spacing and aligning mechanism, comprising:
   (a) an inclined platform;
   (b) rollers for rolling an article along said platform;
   (c) means for linearly moving said rollers;
   (d) means for revolving said rollers; and
   (e) means for linearly moving said platform at a velocity less than the linear velocity of said rollers,
   (f) whereby said rollers orient and separate said articles.

2. The mechanism of claim 1 in which said roller revolving means comprise movable drive means cooperating with said rollers to revolve said rollers at a predetermined velocity regardless of the linear velocity of said rollers.

3. The mechanism of claim 2, in which said movable drive means include a linearly movable member arranged to engage a revolvable member keyed to said rollers during their passage along said platform, so as to revolve said rollers at a velocity proportional to the difference between the linear velocities of said rollers and said linearly movable member.

4. The mechanism of claim 3, in which the linear velocities of said platform and said linearly movable member are substantially equal.

5. The mechanism of claim 3, on which said movable platform is a conveyor belt.

6. An article spacing, aligning and inspecting mechanism of the type having inclined platform means along which an article is rolled by linearly moving and revolving rollers, characterized in that it comprises:
   (a) a plurality of consecutive platform sections;
   (b) platform means in each section driven at different speeds all less than the linear speed of said rollers; and
   (c) means for revolving said rollers at different speeds in each section.

7. The device of claim 6, in which said last-named means include a plurality of linearly movable members consecutively disposed along the path of said rollers opposite said platform sections, said linearly movable members engaging revolvable members keyed to said rollers to revolve said rollers at speeds proportional to the difference between the linear velocities of said rollers and said linearly movable members.

8. The device of claim 7 in which said linearly movable members and said revolvable members are so disposed that any given roller can be operatively associated with only one of said linearly movable members at any given time.

9. The device of claim 7, in which the velocity of each of said linearly movable members is substantially equal to the velocity of the platform section opposite it.

10. The device of claim 9, on which each of said platform sections consist of a plurality of parallel strips, said strips of one section being alternatively disposed with said strips of the next adjacent section, said strips of both sections being guided over concentric pulleys, said pulleys associated with the strips of one section being rotatable independently of the pulleys associated with the strips of the other section.

11. The device of claim 6, further comprising inspection means adjacent each of said rollers.

12. The device of claim 11, including a first section having a relatively fast rotary velocity of said rollers for article spacing and aligning purposes, and a second section in which the rotary velocity of said rollers is such as to impart substantially one revolution to said article over the length of said second section, said inspection means being actuated during passage of said rollers through said second section.

References Cited

UNITED STATES PATENTS

| 1,413,138 | 4/1922  | Skinner   | 198—164 |
| 2,481,130 | 9/1949  | Lindemuth | 198—183 |
| 3,056,483 | 10/1962 | Galloway  | 198—34  |
| 3,234,984 | 2/1966  | Cantoni   | 146—224 |
| 3,310,084 | 3/1967  | Anderson  | 146—224 |

RICHARD E. AEGERTER, Primary Examiner

U.S. Cl. X.R.

198—34, 183